United States Patent Office 3,662,062
Patented May 9, 1972

3,662,062
ANTIVIRAL COMPOSITIONS AND
METHODS OF USE
Russell F. Krueger, Cincinnati, Harry W. Ritter, Sharon-
ville, and Arthur D. Sill, Greenhills, Ohio, assignors to
Richardson-Merrell Inc., New York, N.Y.
No Drawing. Continuation-in-part of application Ser. No.
818,412, Apr. 22, 1969, which is a continuation-in-part
of application Ser. No. 720,332, Apr. 10, 1968, which
in turn is a continuation-in-part of application Ser. No.
607,383, Jan. 5, 1968. This application Sept. 2, 1970,
Ser. No. 69,144
Int. Cl. A61k 27/00
U.S. Cl. 424—85
17 Claims

ABSTRACT OF THE DISCLOSURE

Antiviral compositions and methods for inhibiting or inactivating viruses by subjecting a host to an antivirally effective quantity of a fluorenone of the following Formula I or acid addition salt thereof.

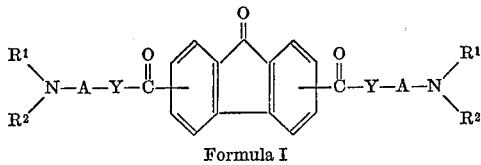

Formula I wherein each Y is oxygen or sulfur; each A is alkylene of 2 to about 8 carbon atoms; and each $R^1$ and $R^2$ is hydrogen, alkyl of 1 to about 6 carbon atoms, cycloalkyl of 3 to 6 carbon atoms, alkenyl of 3 to 6 carbon atoms, or each set of $R^1$ and $R^2$ together with the nitrogen atom to which they are attached can be a saturated monocyclic heterocyclic group. An illustrative fluorenone used in the invention is bis(3-dibutylaminopropyl)-9-oxofluorene-2,7-dicarboxylate dihydrochloride.

This application is a continuation-in-part of our co-pending U.S. patent application Ser. No. 818,412, now abandoned, filed on Apr. 22, 1969 and now abandoned, which in turn is a continuation-in-part of Ser. No. 720,332, filed on Apr. 10, 1968, now abandoned, which in turn is a continuation-in-part of Ser. No. 607,383, now abandoned, filed on Jan. 5, 1967.

BACKGROUND OF THE INVENTION (a) Field of invention: Medicines.
(b) Description of prior art: Only a limited number of viral infections of animals have been treated or prevented by chemical antiviral agents. These include smallpox, Asian influenza, and Herpes keratitis, which are each subject to a specific compound. Infections by very large size viruses such as lymphogranuloma venereum, psittacosis and trachoma can be alleviated by a number of antibiotics and sulfa drugs. In general, virus vaccines have moderate success in animal prophylaxis. However, their number and effectiveness have been limited by problems of cell line viral contamination, multiplicity and changing autigenicity of viruses, sensitivity of hosts, physiologic, physical and geographical factors.

Some of the chemical compounds employed in this invention have been described by D. N. Rindsberg, "Dialkamine Esters of Fluorenone-2,7-Dicarboxylic Acid as Local Anesthetics," Chem. E. Thesis, University of Cincinnati, 1941. The synthesis of these compounds was performed by Rindsberg following a disclosure of an isomeric structure by G. Rieveschl, Jr., "New Local Anesthetics Derived From Fluorene," Ph. D. Thesis, University of Cincinnati, 1940. However, the activity of such compounds against infectious microorganisms was not described, nor, apparently, even contemplated. U.S. Pat. 3,146,259, which issued on Aug. 25, 1964, describes certain fluorenyl bisglyoxal derivatives as antiviral agents. Additional prior art includes U.S. Pat. 3,096,358, which issued on July 2, 1963, and U.S. Pat. 2,377,040, which issued on May 29, 1945. The latter patent claims certain (dialkylaminoalkylene)fluorenone-monocarboxylates and acid addition salts thereof as therapeutic agents.

SUMMARY OF THE INVENTION

This invention relates to compositions which have antiviral activity and the use of such compositions. More particularly, this invention relates to compositions containing bis(aminoalkoxycarbonyl)fluorenone compounds, bis[(aminoalkylthio)carbonyl]fluorenone compounds, or acid addition salts of such compounds and methods for inhibiting or inactivating viruses by subjecting a host or a host and a virus susceptible to replication inhibition by interferon, to an antivirally effective quantity of such compositions. The bis(aminoalkoxycarbonyl)fluorenones, bis-[(aminoalkylthio)carbonyl]fluorenones and acid addition salts of such compounds employed in this invention are more fully described hereinafter and are also referred to herein as the "active ingredients."

DETAILED DESCRIPTION

It has now been found that the chemical compounds of this invention are effective for inactivating, alleviating or inhibiting the symptoms of a broad variety of viruses and can thus be employed as antiviral agents. These fluorenones or salts thereof are effective for preventing or inhibiting characteristic viral disease symptoms in a host, by a wide variety of methods of application and compositions. They can be administered for their antiviral effect by means which subject the host or such host and a virus to the active ingredients. The host is subjected to the active ingredients by bringing together an active ingredient and host, e.g., by applying or contacting the host with such active ingredient or simply administering the active ingredient to the host. This includes subjecting the host to such active ingredient prior to infection with a virus, i.e., prophylactic use, as well as subjecting the host to such active ingredient after infection, i.e., therapeutic use. Thus, in viable biological material hosts subjected to the active ingredients, the replication of viruses is inhibited when the host is infected before or after being subjected to such ingredients. Also, administration, by various routes, of the active ingredients to an animal host prior to or after infection with a virus prevents or inhibits viral replication and the development of the various disease conditions, characteristic of the particular virus. By the term "infection" we simply mean invasion of the host with a pathogenic virus. By the term "host" we mean viable biological material or intact animals which are capable of inducing the formation of interferon and which can support the replication of a virus. Preferably the host is of animal, and particularly warm blooded or mammalian origin. Illustrative of hosts for various viruses there can be mentioned: viable biological material such as can be used in the production of vaccines, e.g., tissue cultures, e.g., that of kidney, lung or amnion cells, embryos, e.g., chick allantoic fluid; and various animals, e.g., warm blooded animals such as mammals or birds, including mice, rats, guinea pigs, gerbils and ferrets.

The quantity of active ingredient employed for inhibiting viruses can vary over a wide range, as will be more fully discussed hereinafter. However, the active ingredients can be used alone, without carriers, or in compositions containing 0.001% by weight or more by weight thereof in a carrier.

The mode of activity of the active ingredients is not rigorously defined. Inter alia, the active ingredients induce the formation of interferon when a host is subject to such ingredients. Interferon is an antiviral substance which is involved with the inhibition of the replication of viruses in the presence of a host cell. Some of the viruses susceptible to replication inhibition by interferon are set forth in Horsefall and Tamm, Viral and Rickettsial Infections of Man, 4th edition (1965), J. B. Lippincott Company, pp. 328–329.

The active ingredients are highly prophylactic, e.g., they have prevented viral diseases in warm blooded animals when administered to such animals as early as 24 or 48 ours prior to infection with a pathogenic dose of a virus. Therapeutic effects, i.e., administration after infection (e.g., subcutaneous injection of a lethal challenge of the virus) of the warm blooded animal with viruses, have been seen when the active ingredients are administered to the animal 8 to 18 or more hours after infection. It will be understood that the time periods for prophylaxis or therapy in relation to the time of infection can vary depending on many factors such as the type of virus, the host, severity of infection, dosage level of the active ingredients, and the like. Generally, the active ingredients appear to have little or no efficacy after the viral disease symptoms are evident in the host infected with a virus, e.g., in the case of mice infected with a lethal dose of encephalomyocarditis virus, bis(3-dibutylaminopropyl) 9-oxofluorene-2,7-dicarboxylate dihydrochloride, was effective when first administered after 12 hours from the time the mice were infected (e.g., by injection of viruses) but not when the treatment with the same quantity of active ingredient was postponed until 18 hours after infection. However, with certain viruses or hosts, active ingredients of this invention were effective when administered 18 hours after infection. As to prophylactic use, the time of effective administration prior to infection will of course differ, depending on the compound, host and other factors discussed herein.

The active ingredients show a good dose/effect response for a fixed as well as a varied challenge (infection, e.g., by injection) of virus in a host. With encephalomyocarditis virus, inactivation of viruses was obtained in mice which were infected with as much as 400 $LD_{50}$ of the virus, as evidenced by prolonged survival time. When infected with viruses as low as 4 $LD_{50}$, essentially all mice survived. Active ingredients, e.g., bis(3-dibutylaminopropyl) 9-oxofluorene-2,7-dicarboxylate dihydrochloride, have a relatively low toxicity and a good therapeutic index. Illustrative of the low toxicity of the active ingredients, the acute toxicity of bis(3-dibutylaminopropyl) 9-oxofluorene-2,7-dicarboxylate dihydrochloride ($LD_{50}$=single dose lethal to 50% of the animals) in 18 to 20 gram mice is:

(a) $LD_{50}$ of 3,000 mg./kg. (milligrams per kilogram of animal weight) when administered orally;

(b) $LD_{50}$ of greater than 3,000 mg./kg. when administered subcutaneously;

(c) $LD_{50}$ of 485 mg./kg. when administered intraperitoneally; and (d) $LD_{50}$ of 100 mg./kg. when administered intravenously.

The subcutaneous acute toxicity ($LD_{50}$) in weanling rats is greater than 800 mg./kg. and in kittens it si greater than 250 mg./kg.

The active ingredients can be used for treatment and/or prophylaxis in preventing viral diseases associated with such syndromes as: paralytic encephalitis, myocarditis, pericardities, pleurodynia, dermatitis, enteritis, non-specific febrile illness and respiratory distress. The active ingredients are particularly efficacious in the prophylaxis or treatment of neutrotropic viral diseases. This includes the inhibition or inactivation of RNA (ribonucleic acid) virus groups such as: picornavirus e.g,. enteroviruses like polio, Coxsackie; Echovirus, encephalomyocarditis and Mengo; arbovirus, e.g., Semliki Forest and vesicular stomatitis; myxovirus, e.g., distemper, influenza, Newcastle disease and rabies. The active ingredients also inactivate DNA (deoxyribonucleic acid) viruses such as that of: Herpes viruses, e.g., Herpes simplex; and poxviruses, e.g., Vaccinia viruses.

The active ingredients can be advantageously employed for prophylactic use in animals exposed to a contagious viral environment. Administration of the active ingredients for such prophylatic use can be shortly prior to exposure. Preferably, the active ingredients are employed both prophylactically and therapeutically. The period during which the animal is exposed to the viral environment will, of course, vary, e.g., from a few minutes or less to a number of days, e.g., 4 days or more, or one or more weeks or months. When the animal is or may be so exposed, it is advantageous to administer daily doses of the active ingredients shortly prior to exposure, during the entire period of the exposure, and preferably the administration should be continued for the prepatent period of the virus. By the term "prepatent period" we mean the time elapsing between infection and appearance of the symptoms. Illustrative of contagious viral environments there can be mentioned: the geographical area or region of a viral epidemic; rooms, quarters or areas of a viral infection of a member of the family group or of large confined animal populations and the infected member or members, e.g., infection with respiratory diseases caused by viruses; travel into a geographical area or region wherein certain viral diseases are endemic; hospitals and similar buildings in which animals having a viral disease are quartered; and other areas in which the likelihood of being infected with a particular virus to which the animal host is susceptible are greater than that which is normally the case by staying out of such area.

The bis(aminoalkoxycarbonyl)fluorenones and bis-[(aminoalkylthio)carbonyl]fluorenones employed in this invention can be represented by the formula:

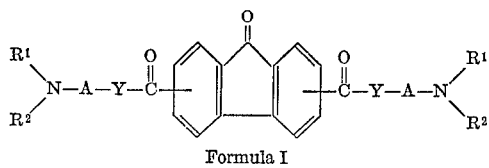

Formula I wherein: each Y is oxygen or sulfur; each A is alkylene of 2 to about 8 carbon atoms; and each $R^1$ and $R^2$ is hydrogen, alkyl of 1 to about 6 carbon atoms, alkenyl of 3 to about 6 carbon atoms, cycloalkyl of 3 to 6 carbon atoms, or each set of $R^1$ and $R^2$, i.e., each pair of $R^1$ and $R^2$ on the same nitrogen, together with the nitrogen to which they are attached, can be a saturated monocyclic heterocyclic group such as those generally equivalent to dialklamino groups in the pharmaceutical arts, e.g., piperidino, pyrrolidino, N-methyl or N-ethylpiperazino.

It can be seen that the side groups on the fluorenone nucleus can be aminoalkoxycarbonyl when Y is oxygen; (aminoalkylthio)carbonyl when Y is sulfur or the nucleus can contain one of each of these substituents. Preferably both of the Y groups are the same and particularly both are oxygen. These side groups can be linked to the fluorenone nucleus by replacement of any of the four hydrogens of the benzenoid ring to which such group is attached; thus one of the

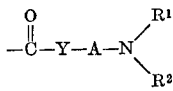

side groups can be in any of the positions of 1 through 4 of the fluorenone nucleus and the other can be in any of the positions of 5 through 8 of the fluorenone nucleus. Preferably, these groups are in the 2 and 7 or 2 and 5 positions, respectively, of the fluorenone nucleus.

The alkylene group as represented by each A in the above generic formula is an alkylene group having from 2 to about 8 carbon atoms which can be straight, e.g., $-CH_2-(CH_2)_n-$ wherein ($n$) is an integer of 1 to 7, or branched-chain and which separates the carboxyl group or carbothiolyl group from the amino nitrogen by an alkylene chain of at least two carbon atoms, i.e., the oxygen (or sulfur) and amino nitrogen are not on the same carbon atom of the alkylene group. Each of the alkylene groups as represented by A can be the same or different. Preferably both of these groups are the same. Illustrative of alkylene groups as represented by A there can be mentioned: 1,2-ethylene; 1,3-propylene; 1,4-butylene; 1,5-pentylene; 1,6-hexylene; 2-methyl-1,4-butylene; 2-ethyl-1,4-butylene; 3-methyl-1,5-pentylene and the like. Preferably A is alkylene having from 2 to 6 carbon atoms.

Each amino group, i.e.,

of Formula I can be a primary, secondary or tertiary amino group. Illustrative of alkyl groups as can be represented by each $R^1$ and $R^2$ there can be mentioned straight or branched-chain alkyls having from 1 to about 6 carbon atoms such as: methyl; ethyl; n-propyl; isopropyl; n-butyl; secondary butyl; tertiary butyl; isoamyl; n-pentyl; n-hexyl; and the like.

Illustrative of cycloalkyl groups as represented by each of $R^1$ and $R^2$ there can be mentioned: cyclopropyl; cyclobutyl; cyclopentyl; cyclohexyl; and the like. When $R^1$ or $R^2$ represent alkenyl groups, the vinyl unsaturation is in other than the 1 position of said alkenyl group. Illustrative of alkenyl groups as can be represented by each of $R^1$ and $R^2$ there can be mentioned: allyl; 3-butenyl; 4-hexenyl; and the like. Illustrative of heterocyclic groups represented by $R^1$ and $R^2$, together with the nitrogen atom to which they are attached, there can be mentioned pyrrolidino, piperidino; N-methylpiperazino; N-ethylpiperazino; and the like. Each $R^1$ and $R^2$ group can be the same or different on each of the side chains of the fluorenone nucleus. Thus, one of the $R^1$ groups can be alkyl whereas the other can be cycloalkyl, both $R^1$ groups can be alkyl and one or both of the $R^2$ groups can be aklenyl, one set of $R^1$ and $R^2$ together with the nitrogen to which they are attached can be heterocyclic whereas the remaining $R^1$ and $R^2$ can be alkyls. Further, other variations can be made. Preferably, however, both of the $R^1$ groups are the same and both of the $R^2$ groups are the same. Preferred substituents for the $R^1$ and $R^2$ groups are the alkyls, which again can be the same or different alkyl radicals, but particularly the same radical for the total of the four $R^1$ and $R^2$ groups.

Illustrative of the fluorenone compounds which can be employed in this invention there can be mentioned:

bis(4-aminobutyl) 9-oxofluorene-2,7-dicarboxylate;
bis(5-aminopentyl) 9-oxofluorene-2,7-dicarboxylate;
bis(4-aminobutyl) 9-oxofluorene-2,5-dicarboxylate;
bis(4-aminobutyl) 9-oxofluorene-1,7-dicarboxylate;
bis(2-diethylaminoethyl) 9-oxofluorene-2,7-dicarboxylate;
bis(3-diethylaminopropyl) 9-oxofluorene-2,7-dicarboxylate;
bis(3-dibutylaminopropyl) 9-oxofluorene-2,7-dicarboxylate;
bis(3-dibutylaminopropyl) 9-oxofluorene-1,7-dicarboxylate;
bis(3-dipropylaminopropyl) 9-oxofluorene-4,5-dicarboxylate;
bis(3-dibutylaminopropyl) 9-oxofluorene-2,5-dicarboxylate;
bis(3-dimethylaminopropyl) 9-oxofluorene-1,6-dicarboxylate;
bis(5-dipropylaminopentyl) 9-oxofluorene-1,5-dicarboxylate;
bis(3-dipentylaminopropyl) 9-oxofluorene-1,7-dicarboxylate;
bis(3-dibutylaminopropyl) 9-oxofluorene-3,6-dicarboxylate;
bis(2-dipropylaminoethyl) 9-oxofluorene-1,6-dicarboxylate;
bis(4-aminobutyl) 9-oxofluorene-2,7-dicarbothiolate;
bis(6-aminohexyl) 9-oxofluorene-2,5-dicarbothiolate;
bis(4-aminobutyl) 9-oxofluorene-1,7-dicarbothiolate;
bis(2-diethylaminoethyl) 9-oxofluorene-2,7-dicarbothiolate;
bis(3-dibutylaminopropyl) 9-oxofluorene-2,7-dicarbothiolate;
bis(3-dibutylaminopropyl) 9-oxofluorene-1,6-dicarbothiolate;
bis(4-butylaminobutyl) 9-oxofluorene-2,5-dicarbothiolate;
bis(4-ethylaminobutyl) 9-oxofluorene-2,7-dicarboxylate;
bis(3-cyclohexylaminopropyl) 9-oxofluorene-2,5-dicarboxylate;
bis(3-dibutylaminopropyl) 9-oxofluorene-1,6-dicarboxylate;
bis(3-diallylaminopropyl) 9-oxofluorene-2,7-dicarboxylate;
bis(3-pyrrolidinopropyl) 9-oxofluorene-2,7-dicarboxylate;

or acid addition salts thereof.

Preferred fluorenone compounds of this invention can be represented by the formula:

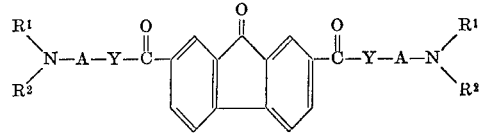

wherein: A is alkylene of 2 to 6 carbon atoms; each of $R^1$ and $R^2$ is alkyl, particularly of 1 to 5 carbon atoms; Y is oxygen or sulfur, and particularly oxygen, or acid addition salts thereof, e.g., bis(3-dibutylaminopropyl) 9-oxofluorene-2,7-dicarboxylate or a salt thereof.

Salts of the fluorenone compounds of this invention are primarily pharmacologically acceptable acid addition salts with inorganic or oragnic acids. Suitable inorganic acids are, for example, mineral acids, such as hydrohalic acids, e.g., hydrochloric or hydrobromic acid, or sulfuric or phosphoric acids. Organic acids are, for example, lower aliphatic hydroxy-hydrocarbon monocarboxylic acids, e.g., glycolic or lactic acid and the like, lower aliphatic lower alkoxy-hydrocarbon monocarboxylic acids, e.g., methoxyacetic and ethoxy-acetic acids and the like, lower aliphatic lower alkanoyl-hydrocarbon monocarboxylic acids, e.g., pyruvic acid and the like, lower aliphatic hydrocarbon dicarboxylic acids, e.g., malonic, succinic, methylsuccinic, dimethylsuccinic, glutaric, α-methylglutaric, β-methylglutaric, itaconic, maleic, citraconic, homocitraconic, or fumaric acid and the like, lower aliphatic hydroxy-hydrocarbon dicarboxylic acids, e.g., malic or tartaric acid and the like, lower aliphatic lower alkoxy-hydrocarbon dicarboxylic acids, e.g., α,β-dimethoxysuccinic or ethoxymaleic acid and the like, lower aliphatic hydrocarbon tricarboxylic acids, e.g., aconitic or tricarballylic acid and the like, lower aliphatic hydroxy-hydrocarbon tricarboxylic acids, e.g., citric acid and the like. Furthermore, organic sulfonic acids, such as lower alkane sulfonic acids, e.g., methanesulfonic or ethanesulfonic acid and the like, or lower hydroxy-alkane sulfonic acids, e.g., 2-hydroxy-ethanesulfonic acid and the like, may be suitable. Particularly useful are pharmacologically acceptable acid addition salts with mineral acids, e.g., hydrochloric acid. Mono or di-acid salts may be formed; also, the salts can be hydrated, e.g., monohydrate, or substantially anhydrous. It has been unexpectedly found that some of the compounds of the invention, e.g., bis(3-dibutylaminopropyl) 9-oxofluorene-2,7-dicarboxylate dihydrochloride, form stable hydrates, whereas the anhydrous form of such compounds tends to be hydroscopic.

The active ingredients can be administered to animals by conventional modes of administration, either alone, but preferably with pharmaceutical carriers. Illustratively, administration can be parenterally, e.g., subcutaneously, intravenously, intramuscularly or intraperitoneally, topically or by intranasal instillation. Such administration can be systemic or to the locus of viral infection. Alternatively or concurrently, administration can be by the oral route, or by application to mucous membranes such as that of the nose and throat, e.g., in an aerosol carrier.

The dosage administered will be dependent upon the virous for which treatment or prophylaxis is desired, the type of hose involved, its age, health, weight, extent of infection, kind of concurrent treatment, if any, frequency of treatment and the nature of the effect desired. Generally, a daily dosage of active ingredient for animals will be from about 0.1 to about 500 mg./kg. of body weight. A dosage for viable biological material, apart from the intact animals, can vary from about 0.1 to 10 micrograms per milliliter of liquid nourishing media and preferably 0.5 to 5 micrograms per milliliter of liquid nourishing media or substrate maintaining the host cells. Illustratively, dosage levels of the active ingredients for animals can be: intravenously, 0.1 to about 10 mg./kg.; intraperitoneal, 0.1 to about 50 mg./kg.; subcutaneous, 0.1 to about 250 mg./kg.; orrally, 10 to about 250 mg./kg.; intranasal instillation, 0.1 to about 10 mg./kg.; and aerosol, 0.1 to about 10 mg./kg. of animal (body) weight.

The active ingredients, together with pharmaceutical carriers, can be employed in unit dosage forms such as solids, e.g., tablets, capsules, powder packets, or liquid solutions, suspensions, or elixers for oral administration and ingestion or liquid solutions for parenteral use. The quantity of active ingredient in the dosage will generally differ depending on the type of unit dosage, the type of animal, and its weight. Thus, each unit dosage can contain from about 1 milligram (mg.) to about 30 grams of active ingredient and preferably from about 25 to 500 mg. of active ingredient and particularly from about 50 mg. to 250 mg. in a pharmaceutical carrier.

The solid unit dosage forms can be of the conventional type. Thus, the solid carrier can be a capsule which can be of the ordinary gelatin type. In the capsule there can be from about 10% to about 90% by weight of active ingredient and from 90% to 10% of a carrier, e.g., lubricant and inert fillers such as lactose, sucrose, corn starch, and the like. In another embodiment, the active ingredient is tabletted with conventional carriers, e.g., binders such as acacia, corn starch or gelatin, disintegrating agents such as corn starch, potato starch, or alginic acid, and a lubricant such as stearic acid, or magnesium stearate. In yet another embodiment, the active ingredient is put into powder packets and employed. These solid unit dosages will generally contain from about 5% to 95% of the active ingredient by weight of the unit dosage and preferably from about 20% to 90% by weight thereof. The solid unit dosage forms will preferably contain from about 5 mg. to about 500 mg. of the active ingredient and preferably from about 25 mg. or 50 mg. to about 250 mg. of the active ingredient.

The pharmaceutical carrier can, as previously indicated, be a sterile liquid such as water and oils, with or without the addition of a surfactant. Illustrative of oils there can be mentioned those of petroleum, animal, vegetable or synthetic origin, e.g., peanut oil, soybean oil, mineral oil, sesame oil, and the like. In general, water, saline, aqueous dextrose, and related sugar solutions and glycols such as propylene glycol or polyethylene glycol are preferred liquid carriers, particularly for injectable solutions. Sterile injectable solutions such as saline, e.g., isotonic saline, will ordinarily contain from about 0.5% to 25% and preferably from about 1 to 10% by weight of the active ingredient in the composition.

As mentioned above, oral administration can be in a suitable suspension or syrup, in which the active ingredient ordinarily will constitute from about 0.5 to 10%, and preferably from about 1% to 5%, by weight. The pharmaceutical carrier in such composition can be a watery vehicle such as an aromatic water, a syrup or a pharmaceutical mucilage; also, a suspending agent for viscosity control such as magnesium aluminum silicate, carboxymethylcellulose or the like as well as a buffer, preservative, etc.

The active ingredients can also be admixed in animal feed or incorporated into the animal's drinking water. For most purposes, an amount of active ingredient will be used to provide from about 0.0001% to 0.1% by weight of the active ingredient based on the total weight of feed intake. Preferably, from 0.001% to 0.02% by weight will be used. The selection of the particular feed is within the knowledge of the art and will depend, of course, on the animal, the economics, natural materials available, and the nature of the effect desired.

The active ingredients can be admixed in animal feed concentrates, suitable for preparation and sale to farmers or livestock growers for addition to the animal's feedstuffs in appropriate proportion. These concentrates can ordinarily comprise about 0.5% to about 95% by weight of the active ingredient compounded together with a finely divided solid, preferably flours, such as wheat, corn, soya bean and cottonseed. Depending on the recipient animal, the solid adjuvant can be ground cereal, charcoal, fuller's earth, oyster shell and the like. Finely divided attapulgite and bentonite can also be used.

The feed compositions, as well as the feed concentrates, can additionally contain other components of feed concentrates or animal feeds, as will be readily understood. Other particularly important additives include proteins, carbohydrates, fats, vitamins, minerals, antibiotics, etc.

For use as aerosols the active ingredients can be packaged in a pressurized aerosol container together with a gaseous or liquefied propellant, e.g., dichlorodifluoromethane, carbon dioxide, nitrogen, propane, etc. with the usual adjuvants such as co-solvents, and wetting agents, as may be necessary or desirable.

Typical surface active agents (Kirk and Othmer, Encyclopedia of Chemical Terminology, 1954, vol. 13, p. 513), particularly emulsifying and dispersing agents which can be used in the compositions of this invention are, e.g., fatty alcohol sulfates such as sodium lauryl sulfate, aliphatic or aromatic sulfonates, such as sulfonated castor oil, and non-ionic types of emulsifying or dispersing agents such as the high molecular weight alkyl polyglycol ethers, such as dodecyl polyglycol ethers containing from about 25 to 75 carbon atoms.

A preferred mode of administration for the compounds (active ingredients) of this invention is parenterally such as by normally liquid injectable compositions, e.g., for intramuscular or subcutaneous administration. In such compositions the quantity of active ingredient can vary from about 0.5% to 25% by weight of the composition and preferably from about 0.1% to 10% by weight. In order to minimize or eliminate irritation at the site of injection, the parenteral compositions can contain a non-ionic surfactant such as those having an HLB (hydrophile-lipophile balance) of about 12 to 17. Such formulations can be solutions, suspensions or emulsions in conventional liquid pharmaceutical carriers, e.g., sterile liquids such as water, saline, and aqueous dextrose (glucose) and related sugar solutions. The quantity of surfactant in the formulation can vary from about 5% to 15% by weight of the formulation. The quantity of a compound of this invention, either in the base form or a pharmaceutically acceptable acid addition salt in such formulations, can vary over a broad range such as that mentioned hereinbefore, i.e., 0.05% to 20% by weight of the formulation. Preferably, the active ingredient is in the base form. The remaining component or components of such formulations can be a normally liquid pharmaceutical carrier, e.g., isotonic aqueous saline, either alone or together with conventional excepients for injectable compositions. The surfactant can be a single surfactant having the above indicated HLB or a mixture of two or more surfactants wherein such mixture has the indicated HLB. The following surfactants are illustrative of those which can be used in such formulations: (A) Polyoxyethylene derivatives of sorbitan fatty acid esters, such as the Tween series of surfactants, e.g., Tween 80, and the like. The Tweens are manufactured by Atlas Powder Company. (B) High molecular weight adducts of ethylene oxide with a hydrophobic base formed by the condensation of propylene oxide with propylene glycol, e.g., Pluronic F-68 which is manufactured by Wyandotte Chemical Company. The preferred surfactant is Polysorbate 80, U.S. P., a polyoxyethylene sorbitan monooleate.

Due to the broad spectrum of activity for RNA type viruses, the active ingredients should be effective in the prophylaxis and treatment of plant viruses by applying to living plants a quantity of the active ingredient sufficent to inactivate such viruses. For such purposes, the composition employed can be in liquid or solid form, e.g., a pulverulent clay having admixed therein from about 0.5 to 10% of the active ingredient and which is dusted on to the leaves and stem of the growing plant and optionally the soil adjoining the plant.

The following examples, in summary form, are illustrative of the invention.

Examples 1 to 19–I illustrate in vivo or in vitro antiviral studies with active ingredients of this invention. Each example recites pertinent information involved. Table I lists the active ingredient which was administered in each of the examples. Although it is believed that the headings in the examples are self-explanatory, some of the headings are explained as follows: The "Challenge," i.e., inoculation with a virus, used is generally fatal to all the untreated, i.e., control, animals in the experiment. "Time of death" refers to the average time of death for the untreated animals. The "Treatment" was prophylactic or therapeutic or both. The term "volume" refers to the volume of composition administered per dose which contained the active ingredient dissolved in sterile water which also contained 0.15% of hydroxyethylcellulose. The control animals received a sham dosage of the same volume of the vehicle which did not contain the active ingredient. The abbreviation "STR" is survival time ratio, which is calculated by dividing the mean day of death of the control animals into the mean day of death of the treated animals during the period of observation. The activity of the compound in the example involved is further characterized, e.g., low, medium, high, etc. A survival time ratio (STR) of less than 0.90 indicates that the compound was toxic; a ratio of 0.90 to 1.09 indicates that there is no activity; a ratio of 1.10 to 1.19 indicates low or weak activity; a ratio of 1.20 to 1.29 indicates medium activity; and a ratio of 1.30 and greater indicates high activity.

TABLE I

| Example | Active ingredient |
|---|---|
| 1–13 | Bis(3-dibutylaminopropyl) 9-oxofluorene-2,7-dicarboxylate dihydrochloride. |
| 14 | Bis(3-diethylaminopropyl) 9-oxofluorene-2,7-dicarboxylate dihydrochloride. |
| 15 | Bis(2-diethylaminoethyl) 9-oxofluorene-2,7-dicarboxylate dihydrochloride. |
| 16 | Bis(2-dimethylaminoethyl) 9-oxofluorene-2,7-dicarboxylate dihydrochloride. |
| 17 | Bis(2-diisopropylaminoethyl) 9-oxofluorene-2,7-dicarboxylate dihydrochloride. |
| 18 | Bis(3-dibutylaminopropyl) 9-oxofluorene-2,7-dicarboxylate dihydrochloride. |
| 19 | Do. |
| 19–A | Do. |
| 19–B | Do. |
| 19–C | Bis(2-diethylaminoethyl) 9-oxofluorene-2,7-dicarbothiolate dihydrochloride. |
| 19–D | Bis(3-diethylaminopropyl) 9-oxofluorene-2,5-dicarboxylate dihydrochloride. |
| 19–E | Bis(5-amino-2,2-dimethylpentyl) 9-oxofluorene-2,7-dicarboxylate dihydrochloride having ⅔ of a mole of water of crystallization. |
| 19–F | Bis(2-diethylamino-1,1-dimethylethyl) 9-oxofluorene-2,7-dicarboxylate dihydrochloride hemihydrate. |
| 19–G | Bis(3-diallylaminopropyl) 9-oxofluorene-2,7-dicarboxylate dihydrochloride. |
| 19–H | Bis[2-(N-methyl-N-cyclohexylamino) ethyl] 9-oxofluorene-2,7-dicarboxylate dihydrochloride. |
| 19–I | Bis(3-piperidinopropyl) 9-oxofluorene-2,7-dicarboxylate dihydrochloride. |

| Example | 1 | 2 | 3 | 4 |
|---|---|---|---|---|
| Virus | PR–8 influenza | PR–8 influenza | Encephalomyocarditis | PR–8i nfluenza. |
| Type | RNA, myxovirus | RNA, myxovirus | RNA, picornavirus | RNA, myxovirus. |
| Challenge | 8 $LD_{50}$ | 8 $LD_{50}$ | 35 $LD_{50}$ | 6 $LD_{50}$ |
| Route | Intranasal | Intranasal | Subcutaneous | Intranasal. |
| Time of death | 5 days | 5 days | 5 days | 5 days. |
| Period of observation | 10 days | 10 days | 10 days | 10 days. |
| Animal | Mice | Mice | Mice | Mice. |
| Weight | 12–15 g | 12–15 g | 12–15 g | 12–15 g. |
| No. in treated group | 10 | 10 | 10 | 10. |
| No. in control group | 20 | 10 | 10 | 20. |
| Treatment | Prophylactic and therapeutic. | Prophylactic | Therapeutic | Therapeutic. |
| Dosage level | 10 mg./kg | 250 mg./kg | 500 mg./kg | 250 mg./kg. |
| Route | Oral | Oral | Subcutaneous | Subcutaneous. |
| Volume | 0.25 ml | 0.25 ml | 0.25 ml | 0.25 ml. |
| Time: | | | | |
| Pre-challenge | 24, 18 and 3 hrs | 24, 18 and 4 hrs | | |
| Post-challenge | 3, 18 and 24 hrs | | 4 hrs | 18 hrs. bid 7 days. |
| Results: | | | | |
| STR | 1.33 | 1.16 | 1.39 | 1.23. |
| Activity | High | Low | High | Medium. |

TABLE—Continued

| Example | 5 | 6 | 7 | 8 |
|---|---|---|---|---|
| Virus | PR8 influenza | Asaian influenza | Herpes simplex | Encephalomyocarditis. |
| Type | RNA, myxovirus | RNA, myxovirus | DNA, Herpes virus | RNA, picornavirus. |
| Challenge | 10-5 dilution | 10-5 dilution | 10-3.5 of virus | 4 LD$_{50}$. |
| Route | Intranasal | Intranasal | Test tube | Subcutaneous. |
| Time of death | 5 days | 7 days | | 5 days. |
| Period of observation | 14 days | 16 days | 6 days | 10 days. |
| Animal | Mice | Mice | Tissue culture, chick embroyo. | Mice. |
| Weight | 18–20 g | 18–20 g | | 12–15 g. |
| No. in treated group | 9 | 10 | | 10. |
| No. in control group | 9 | 10 | | 10. |
| Treatment | Prophylactic and therapeutic. | Simultaneous with infection. | Inactivating conc. | Prophylactic and therapeutic. |
| Dosage level | 5 ml. of 10% solution | 1, 3 and 10 mg./kg | 5 mcg. (microgram)/ml. of liquid nourishing media. | 50 mg./kg. |
| Route | Aerosol inhalation | Intranasal | Tube | Subcutaneous. |
| Volume | | 0.05 ml | | 0.25 ml. |
| Time: Pre-challenge | 28, 22½ and 3½ hrs | Zero hour | | 24, 18 and 3 hrs. |
| Time: Post-challenge | 20½ hrs | | | 3, 18 and 24 hrs. |
| Results | | 1 mg./kg.  3 mg./kg.  10 mg./kg. | Minimum effective dose: <5 mcg./ml. | 1.86. |
| STR | 1.39 | 1.22 ..... 1.38 ..... 2.25 | | |
| Activity | High | Med .... High .... High | Active | High. |

| Example | 9 | 10 | 11 | 12 |
|---|---|---|---|---|
| Virus | Encephalomyocarditis | PR8 influenza | PR8 influenza | PR8 influenza. |
| Type | RNA, picornavirus | RNA, myxovirus | RNA, myxovirus | RNA, myxovirus. |
| Challenge | 4 LD$_{50}$ | 10 LD$_{50}$ | 110 LD$_{50}$ | 6 LD$_{50}$. |
| Route | Subcutaneous | Intranasal | Intranasal | Intranasal. |
| Time of death | 5 days | 5 days | 5 days | 5 days. |
| Period of observation | 10 days | 10 days | 10 days | 10 days. |
| Animal | Mice | Mice | Mice | Mice. |
| Weight | 12–15 g | 12–15 g | 12–15 g | 12–15 g. |
| No. in treated group | 10 | 10 | 10 | 10. |
| No. in control group | 10 | 30 | 20 | 20. |
| Treatment | Prophylactic | Prophylactic and therapeutic. | Prophylactic and therapeutic. | Prophylactic. |
| Dosage level | 250 mg./kg | 250 mg./kg | 100 mg./kg | 10 mg./kg. |
| Route | Intraperitoneal | Subcutaneous | Subcutaneous | Intranasal. |
| Volume | 0.25 ml | 0.25 ml | 0.25 ml | 0.05 ml. |
| Time: Pre-challenge | 24 hours | 24, 18, and 3 hrs | 24, 18, and 3 hrs | 4 hrs. |
| Time: Post-challenge | | 3, 18, and 24 hrs | 3, 18, and 24 hrs | |
| Results: STR | 1.73 | 1.32 | 1.10 | 1.19. |
| Activity | High | High | Weak | Weak. |

| Example | 13 | 14 | 15 | 16 |
|---|---|---|---|---|
| Virus | PR8 influenza | Encephalomyocarditis | Encephalomyocarditis | Encephalomyocarditis |
| Type | RNA, myxovirus | RNA, picornavirus | RNA, picornavirus | RNA, picornavirus. |
| Challenge | 8 LD$_{50}$ | 40 LD$_{50}$ | 40 LD$_{50}$ | 45 LD$_{55}$. |
| Route | Intranasal | Subcutaneous | Subcutaneous | Subcutaneous. |
| Time of death | 5 days | 5 days | 5 days | 5 days. |
| Period of observation | 10 days | 10 days | 10 days | 10 days. |
| Animal | Mice | Mice | Mice | Mice. |
| Weight | 12–15 g | 12–15 g | 12–15 g | 12–15 g. |
| No. in treated group | 10 | 10 | 10 | 7. |
| No. in control group | 20 | 10 | 10 | 30. |
| Treatment | Therapeutic | Prophylactic and therapeutic. | Prophylactic and therapeutic. | Prophylactic and therapeutic. |
| Dosage level | 250 mg./kg | 250 mg./kg | 250 mg./kg | 250 mg./kg. |
| Route | Oral | Subcutaneous | Subcutaneous | Subcutaneous. |
| Volume | 0.25 ml | 0.25 ml | 0.25 ml | 0.25 ml. |
| Time: Pre-challenge | | 24, 18, and 3 hrs | 24, 18, and 3 hrs | 24, 18, and 3 hrs. |
| Time: Post-challenge | 18, bid 8 days | 3, 18, and 24 hos | 3, 18, and 24 hrs | 3, 18, and 24 hrs. |
| Results: STR | 1.27 | 1.66 | 1.56 | 1.60. |
| Activity | Medium | High | High | High. |

| Example | 17 | 18 | 19 |
|---|---|---|---|
| Virus | Encephalomycaditis | Rabies | Canine distemper. |
| Type | RNA, picornavirus | RNA, myxovirus | RNA, myxovirus. |
| Challenge | 45 LD$_{50}$ | 0.5 ml. brain | 1 ml. distemperoid. |
| Route | Subcutaneous | Intramuscular | Subcutaneous. |
| Time of death | 5 days | 10 days | 10–15 days. |
| Period of observation | 10 days | 14 days | 11 days. |
| Animal | Mice | Guinea pigs | Ferrets. |
| Weight | 12–15 g | 400–450 g | 1.5 kg. |
| No. in treated group | 9 | 20 | 16. |
| No. in control group | 30 | 20 | 16. |
| Treatment | Prophylactic and therapeutic | Prophylactic and therapeutic | Prophylactic and therapeutic. |
| Dosage level | 250 mg./kg | 50 and 150 mg./kg | 50 and 250 mg./kg. |
| Route | Subcutaneous | Subcutaneous | Subcutaneous. |
| Volume | 0.25 ml | 1 ml | 1 ml. and 1.5 ml. |
| Time: Pre-challenge | 24, 18 and 3 hrs | 24, 18 and 3 hrs | 24, 18 and 3 hrs. |
| Time: Post-challenge | 3, 18 and 24 hrs | 3 hours and bid for 3 or 4 days* | 3, 18 and 24 hrs. |
| Results | | 50 mg./kg ......... 150 mg./kg | All infected controls with distemper febrile response but none in any treated ferret. |
| STR | 1.31 | 1.33 ..... 1.36 | |
| Activity | Medium | High ..... High | |

TABLE—Continued

| Example | 19-A | 19-B | 19-C |
|---|---|---|---|
| Virus | Encephalomyocarditis | Coxsackie A$_{21}$ | Encephalomyocarditis. |
| Type | RNA, picornavirus | RNA, picornavirus | RNA, picornavirus. |
| Challenge | 5 LD$_{50}$ | LD$_{50}$ | 4 LD$_{50}$ |
| Route | Subcutaneous | Subcutaneous | Subcutaneous. |
| Time of death | 5 days | 8–10 days | 5 days. |
| Period of observation | 10 days | 14 days | 10 days. |
| Animal | Guinea pigs | Mice | Mice. |
| Weight | 125 grams | 15 grams | 12–15 grams. |
| No. in treated group | 5 | 10 | 10. |
| No. in control group | 5 | 10 | 10. |
| Treatment | Prophylactic and therapeutic | Prophylactic and therapeutic | Prophylactic and therapeutic. |
| Dosage level | 100 mg./kg | 50 mg./kg | 100 mg./kg. |
| Route | Subcutaneous | Subcutaneous | Subcutaneous. |
| Volume | 1.0 ml | 0.25 ml | 0.25 ml. |
| Time: | | | |
| Pre-challenge | 28, 22 and 4 hrs | 28, 22 and 4 hrs | 28, 22 and 4 hrs. |
| Post-challenge | 2, 20 and 26 hrs | 2, 20 and 26 hrs | 2, 20 and 26 hrs. |
| Results: | | | |
| STR | 1.42 | 1.40 | 1.34. |
| Activity | High | High | High. |

| Example | 19-D | 19-E | 19-F |
|---|---|---|---|
| Virus | Encephalomyocarditis | Encephalomyocarditis | Encephalomyocarditis. |
| Type | RNA, picornavirus | RNA, picornavirus | RNA, picornavirus. |
| Challenge | 13 LD$_{50}$ | 15 LD$_{50}$ | 10 LD$_{50}$. |
| Route | Subcutaneous | Subcutaneous | Subcutaneous. |
| Time of death | 5 days | 5 days | 5 days. |
| Period of observation | 10 days | 10 days | 10 days. |
| Animal | Mice | Mice | Mice. |
| Weight | 12–15 grams | 12–15 grams | 12–15 grams. |
| No. in treated group | 10 | 10 | 10. |
| No. in control group | 10 | 10 | 10. |
| Treatment | Prophylactic and therapeutic | Prophylactic and therapeutic | Prophylactic and therapeutic. |
| Dosage level | 250 mg./kg | 50 mg./kg | 250 mg./kg. |
| Route | Subcutaneous | Subcutaneous | Subcutaneous. |
| Volume | 0.25 ml | 0.25 ml | 0.25 ml. |
| Time: | | | |
| Pre-challenge | 28, 22 and 4 hrs | 28, 22 and 4 hrs | 28, 22 and 4 hrs. |
| Post-challenge | 2, 20 and 26 hrs | 2, 20 and 26 hrs | 2, 20 and 26 hrs. |
| Results: | | | |
| STR | 1.49 | 1.70 | 1.66. |
| Activity | High | High | High. |

| Example | 19-G | 19-H | 19-I |
|---|---|---|---|
| Virus | Encephalomyocarditis | Encephalomyocarditis | Encephalomyocarditis. |
| Type | RNA, picornavirus | RNA, picornavirus | RNA, picornavirus. |
| Challenge | 10 LD$_{50}$ | 7 LD$_{50}$ | 32 LD$_{50}$. |
| Route | Subcutaneous | Subcutaneous | Subcutaneous. |
| Time of death | 5 days | 5 days | 5 days. |
| Period of observation | 10 days | 10 days | 10 days. |
| Animal | Mice | Mice | Mice. |
| Weight | 12–15 grams | 12–15 grams | 12–15 grams. |
| No. in treated group | 10 | 10 | 10. |
| No. in control group | 10 | 10 | 10. |
| Treatment | Prophylactic and therapeutic | Prophylactic and therapeutic | Prophylactic and therapeutic. |
| Dosage level | 250 mg./kg | 250 mg./kg | 250 mg./kg. |
| Route | Subcutaneous | Subcutaneous | Subcutaneous. |
| Volume | 0.25 ml | 0.25 ml | 0.25 ml. |
| Time: | | | |
| Pre-challenge | 28, 22 and 4 hrs | 28, 22 and 4 hrs | 28, 22 and 4 hrs. |
| Post-challenge | 2, 20 and 26 hrs | 2, 20 and 26 hrs | 2, 20 and 26 hrs. |
| Results: | | | |
| STR | 1.70 | 1.45 | 2.02. |
| Activity | High | High | High. |

*Bid for 4 days at 50 mg./kg. but 3 days at 150 mg./kg.

EXAMPLE 20

An illustrative composition for a parenteral injection is the following wherein the quantities are on a weight to volume basis.

(a) Bis(3-dibutylaminopropyl) 9-oxofluorene-2,7-dicarboxylate dihydrochloride—100 mg.
(b) Sodium chloride, q.s.
(c) Water for injection to make 10 ml.

The composition is prepared by dissolving the active ingredient and sufficient sodium chloride in water for injection to render the solution isotonic. The composition may be dispensed in a single ampule containing 100 mg. of the active ingredient for multiple dosage or in 10 ampules for a single dosage.

EXAMPLE 21

An illustrative composition for hard gelatin capsules is as follows:

Per capsule, mg.
(a) Bis(3-dibutylaminopropyl) 9-oxofluorene-2,7-dicarboxylate dihydrochloride _____ 200
(b) Talc _____ 35

The formulation is prepared by passing the dry powders of (a) and (b) through a fine mesh screen and mixing them well. The powder is then filled into No. 0 hard gelatin capsules at a net fill of 235 mg. per capsule.

EXAMPLE 22

An illustrative composition for tablets is as follows:

| | Per tablet, mg. |
|---|---|
| (a) Bis(3-dibutylaminopropyl) 9 - oxofluorene-2,7-dicarboxylate dihydrochloride | 100 |
| (b) Wheat starch | 15 |
| (c) Lactose | 33.5 |
| (d) Magnesium stearate | 1.5 |

Preparation: A granulation obtained upon mixing lactose with the starch and granulated starch paste is dried, screened and mixed with the active ingredient and magnesium stearate. The mixture is compressed in tablets weighing 150 mg. each.

EXAMPLE 23

An illustrative composition for pills is as follows:

| | Per pill, mg. |
|---|---|
| (a) Bis(3 - dibutylaminopropyl) 9 - oxofluorene-2,7-dicarboxylate dihydrochloride | 100 |
| (b) Starch, corn | 90 |
| (c) Liquid glucose | 10 |

The pills are prepared by blending the active ingredient and starch and then adding the liquid glucose with thorough kneading to form a plastic mass. The pills are then cut and formed from the plastic pill mass.

EXAMPLE 24

A 2% weight per volume syrup of bis(3-dibutylaminopropyl) 9-oxofluorene-2,7-dicarboxylate dihydrochloride can be prepared by the usual pharmaceutical techniques according to the following formula:

| | Grams |
|---|---|
| (a) Finely divided bis(3 - dibutylaminopropyl) 9-oxofluorene-2,7-dicarboxylate dihydrochloride | 2.0 |
| (b) Sucrose | 33.3 |
| (c) Chloroform | 0.25 |
| (d) Sodium benzoate | 0.4 |
| (e) Methyl p-hydroxybenzoate | 0.02 |
| (f) Vanillin | 0.04 |
| (g) Glycerol | 1.5 |
| (h) Purified water to 100.0 ml. | |

EXAMPLE 25

An illustrative composition for hard gelatin capsules is as follows:

| | Per capsule, mg. |
|---|---|
| (a) Bis(3 - diethylaminopropyl) 9 - oxofluorene-2,7-dicarbothiolate bis-dihydrogen citrate | 200 |
| (b) Talc | 40 |

The formulation is prepared by passing the dry powders of (a) and (b) through a fine mesh screen and mixing them well. The powder is then filled into No. 0 hard gelatin capsules at a net fill of 240 mg. per capsule.

EXAMPLE 26

Bis(3-dibutylaminopropyl) 9-oxofluorene-2,7-dicarboxylate dihydrochloride is mixed with soybean meal to prepare an animal feed concentrate containing 10 grams of said fluorenone compound per pound of the medicated feed. This can subsequently be diluted with a mixed grain ration to give a medicated feed containing 50 milligrams of the fluorenone per pound of the medicated feed.

EXAMPLE 27

The following formulation is illustrative of a dusting powder:

| | Per kilogram, grams |
|---|---|
| (a) Bis(3 - dibutylaminopropyl) 9 - oxofluorene-2,7-dicarboxylate dihydrochloride | 20 |
| (b) Silica aerogel | 980 |

The dusting powder is prepared by intimately admixing the ingredients. The mixture is then packaged in dispensing containers.

EXAMPLE 28

An illustrative composition for a parenteral injection is the following aqueous emulsion:

| Ingredient | | Amount |
|---|---|---|
| Each ml. contains— | | |
| 50 mg. | Bis(3-dibutylaminopropyl) 9-oxofluorene-2,7-dicarboxylate dihydrochloride. | 1.000 gm. |
| 100 mg. | Polysorbate 80 | 2.000 gm. |
| 0.0064 mg. | Sodium chloride | 0.128 gm. |
| Water for injection, q.s. | | 20.000 ml. |

The composition of Example 28 is prepared by: dissolving 0.64 gram of sodium chloride in 100 ml. of water for injection; mixing the Polysorbate 80 with the active ingredient, adding a sufficient solution of the sodium chloride in water to the active ingredient and Polysorbate to make 20 ml.; shaking the mixture; and then autoclaving it for 20 minutes at 110° C. at 15 p.s.i.g. steam pressure. The composition can be dispensed in a single ampule for multiple dosage or in 10 or 20 ampules for single dosages.

The above Examples 20 to 28 illustrate various formulations employing active ingredients of this invention. Other active ingredients can, of course, be employed in place of that in the above formulations or similar formulations, illustratively, various water soluble acid addition salts, e.g., the hydrochloride, hydrobromide, lactate and the like of the following active ingredients can be substituted in the above formulations: bis(3-dimethylaminopropyl) 9 - oxofluorene-2,7-dicarboxylate; bis(2-dimethylaminoethyl) 9-oxofluorene-1,7-dicarboxylate; bis(2 - dimethylaminoethyl) 9-oxofluorene-2,7-dicarbothiolate; and the like. Also, particularly when water solubility is not desirable, the active ingredients can be used in the base form.

The tertiary amino bis(aminoalkoxycarbonyl)fluorenones and bis[(aminoalkylthio)carbonyl]fluorenones employed in this invention can be prepared by reacting, in the presence or absence of a condensing agent, a fluorenone dicarboxylic acid or a reactive derivative thereof, such as a halide or ester of the formula:

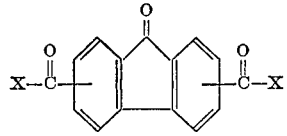

wherein X represents an OH group, a halogen, an O-lower alkyl group, or the like with an aminoalkanol or aminoalkanethiol of the formula:

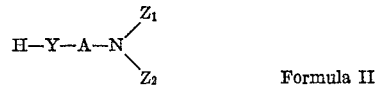

Formula II wherein Y is O or S, A is alkylene of two to about eight carbon atoms, and each of $Z_1$ and $Z_2$ has the same meaning as $R^1$ and $R^2$ of Formula I, except that neither $Z_1$ nor $Z_2$ can be hydrogen.

The secondary or primary amino bis(aminoalkoxycarbonyl) fluorenones and bis[(aminoalkylthio)carbonyl]fluorenones employed in this invention can be prepared by a similar reaction to the above if the amino group of the aminoalkanol or aminoalkanethiol is suitably blocked to reactivity by formation of a salt or, preferably, by substituting it with a readily removal blocking group such as trifluoroacetyl, carbobenzoxy or the like, followed by removal of the blocking group with a suitable technique such as mild acid hydrolysis or catalytic reduction.

Alternatively, the compounds of the invention may be produced by reacting a fluorenone dicarboxylic acid or a salt thereof with a reactive ester of an aminoalkanol or aminoalkanethiol or a salt thereof in the presence, if desired, of an agent which binds acid. Among reactive esters of aminoalkanols or aminoalkanethiols are particularly included esters of these with hydrohalic acids, arylsulfonic acids and the like.

Still another method for the production of the compounds of the invention consists of converting the fluorenone dicarboxylic acids into their halogen-alkanol or halogen-alkanethiol diesters of the formula:

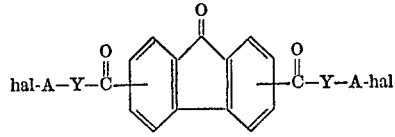

wherein hal is chlorine, bromine or iodine and A and Y are as previously defined in Formula I; and the latter caused to react with an amine of the formula:

wherein each of $Z_1$ and $Z_2$ have the same meaning as in the above Formula II.

EXAMPLE 29

A suspension of 30.5 g. (0.10 mole) of 9-oxofluorene-2,7 - dicarbonyl chloride in 1 liter of dry chloroform (ethanol-free) is stirred and treated all at once with 37.5 g. (0.20 mole) of dry 3-di-n-butylamino-1-propanol causing a mildly exothermic reaction. The resulting mixture is stirred and refluxed for two hours, cooled to room temperature, filtered and the filtrate washed three times with 250-ml. portions of saturated sodium bicarbonate solution. The chloroform solution is then washed with water and saturated sodium chloride solution, dried over anhydrous sodium sulfate and filtered. Most of the solvent is removed from the filtrate on the steam bath under vacuum and the residue dissolved in butanone. This solution is made acid to Congo red with ethereal HCl causing the product to precipitate as a yellow crystalline solid. The bis(3 - di-n-butylaminopropyl) 9-oxofluorene-2,7-dicarboxylate dihydrochloride is filtered, recrystallized from butanone-methanol (just sufficient methanol to dissolve the solid in the boiling solution) and dried. The compound on standing in the atmosphere formed a monohydrate, M.P. 178.5–179.5°, $\lambda_{max.}^{water}$ 276, $E_{1\ cm.}^{1\%}$ 1370

In a manner similar to that of Example 29, the following bis(aminoalkyl) esters of 9 - oxofluorene-2,7-dicarboxylic acid were obtained:

| Ester | M.P., °C. (2HCl salt) | λ max. | Solvent | $E_{1\ cm.}^{1\%}$ |
|---|---|---|---|---|
| 2-dimethylaminoethyl | [1] 254–6 | 276 | Water | 2,010 |
| 2-diisopropylaminoethyl | [1] 245–7 | 276 | do | 1,640 |
| 2-dihexylaminoethyl | 185–6.5 | 273.5 | Ethanol | 1,280 |
| 2-morpholinoethyl [2] | [1] 247–8 | 276 | Water | 1,627 |
| 3-diethylaminopropyl | [1] 251–2 | 276 | do | 1,720 |
| 4-diethylamino-1-methylbutyl | 170–90 | 276 | do | 1,590 |
| 2-diethylaminoethyl | [1] 260.5–261.5 | 276 | do | 1,790 |
| 2-dibutylaminoethyl [3] | [1] 194–195 | 276 | do | 1,480 |
| 4-diethylaminobutyl | 216–217.5 | 276 | do | 1,620 |
| 2-(N-methyl-N-cyclohexylamino)ethyl | [1] 252 | 276 | do | 1,600 |
| 3-dipropylaminopropyl | [1] 227–230 | 275.5 | do | 1,500 |
| 3-dimethylaminopropyl | [1] 285–286 | 276 | do | 1,890 |
| 5-diethylaminopentyl | [1] 225–226 | 276 | do | 1,590 |
| 3-diallylaminopropyl | [1] 234–236 | 276 | do | 1,560 |
| 2-diethylamino-1,1-dimethylethyl [3] | 204–206 | 277 | do | 1,550 |
| 6-diethylaminohexyl | [1] 214.5–216.5 | 275 | do | 1,500 |
| 3-piperidinopropyl | [1] 293–295 | 276 | do | 1,690 |

[1] Dec.
[2] Hemihydrate.
[3] Contains about 1% water.

EXAMPLE 30

12.2 grams (0.04 mole) of 9-oxofluorene-2,7-dicarbonyl chloride and 14.4 grams (0.085 mole) of diethylaminoethanethiol hydrochloride were mixed in 500 ml. of dried chloroform. The reactants were refluxed with stirring for two hours and allowed to cool to room temperature. The mixture was diluted with 180 ml. of saturated sodium bicarbonate solution and 165 ml. water. After thorough mixing, the layers were separated and the aqueous layer was extracted twice with chloroform. The combined chloroform extracts were washed with water and saturated sodium chloride and dried over $MgSO_4$. After filtering the $MgSO_4$, the filtrate was acidified to Congo red paper with ethereal HCl. Upon concentration and cooling, a yellow crystalline precipitate of bis(2 - diethylaminoethyl) 9-oxofluorene-2,7-dicarbothiolate dihydrochloride separated. It was filtered off, washed with ether, dried and recrystallized from methanol. M.P. 265–7° C., $\lambda_{maxr.}^{water}$ 287.5, $E_{1\ cm.}^{1\%}$ 1020

EXAMPLE 31

A slow stream of dry hydrogen chloride is passed into a slurry of 53.6 grams (0.2 mole) of 9 oxofluorene-2,7-dicarboxylic acid in one liter of absolute ethanol until the mixture is saturated. After standing overnight, it is refluxed with stirring for several hours, cooled and filtered. The diethyl 9-oxofluorene-2,7-dicarboxylate thus obtained in excellent yield melts at 198–202° C. Recrystallization of a sample from acetone/chloroform raises the melting point to 200.5–202.5° C.

To a solution of 32.4 grams (0.1 mole) of the above diethyl ester in 300 ml. dry xylene is added 50 ml. (excess) of 3-dibutylaminopropanol and 0.2 gram sodium metal. The reaction flask is connected to an efcient fractionation column and slow distillation to separate the ethanol is begun. After approximately 100 ml. of distillate is collected, the solvent and excess amino alcohol are removed by evaporation first at water pump vacuum, then under high vacuum. The oily residue is taken up in chloroform, washed with water and dried over $MgSO_4$. After acidification to Congo paper with ethereal HCl, the bulk of the chloroform is evaporated and the bis(3-dibutylaminopropyl) 9-oxofluorene-2,7-dicarboxylate dihydrochloride is crystallized by the addition of butanone.

EXAMPLE 32

Preparation of bis(3-diethylaminopropyl) 9-oxofluorene-2,5-dicarboxylate dihydrochloride To 5.55 g. (0.018 mole) of 9-oxofluorene-2,5-dicarbonyl chloride, prepared by standard methods from the acid of Example 33, in 200 ml. of chloroform was added 4.78 g. (0.036 mole) of 3-diethylaminopropanol and the resulting solution was refluxed for 3 hours, diluted with methyl ethyl ketone and on cooling the subject compound crystallized. Recrystalliaztion from methanol-ethyl acetate gave the yellow product, M.P. 203–205°, $\lambda_{max.}^{EtOH}$ 275, $E_{1\ cm.}^{1\%}$ 923

EXAMPLE 33

Preparation of 9-oxofluorene-2,5-dicarboxylic acid

To a stirred suspension of 47.5 g. (0.354 mole) of anhydrous aluminum chloride and 25.0 g. (0.118 mole) of fluorene-4-carboxylic acid in 700 ml. of carbon disulfide chilled to 0° was slowly added 45.0 g. (0.354 mole) of oxalyl chloride in 200 ml. of carbon disulfide. After 6 hours at 0°, an additional 16 g. (0.118 mole) of anhydrous aluminum chloride and 45.0 g. (0.354 mole) of oxalyl chloride was added, and the reaction mixture was allowed to stir for 64 hours at room temperature. After the normal work-up of Friedel-Crafts reactions, there was obtained 25 g. of fluorene-2,5-dicarboxylic acid which was converted to 9-oxofluorene-2,5-dicarboxylic acid by permanganate oxidation. The product decomposes at 330–335° and was further characterized as its dimethyl ester, M.P. 180–181.

EXAMPLE 34

Preparation of bis(3-di-n-butylaminopropyl) 9-oxofluorene-2,7-dicarboxylate dihydrochloride A mixture of 13.5 g. (0.05 mole) of 9-oxofluorene-2,7-dicarboxylic acid and 47.0 g. (0.23 mole) of 3-di-n-butylaminopropyl chloride in 500 ml. of isopropyl alcohol was stirred and refluxed for 19 hours. The hot reaction mixture was filtered, concentrated under reduced pressure to a volume of 150 ml. and teated with 1000 ml. of ether. The precipitate which formed was filtered, recrystallized from acetonemethanol, dried and exposed to the atmosphere to give bis-(3-di-n-butylaminopropyl) 9-oxofluorene-2,7-dicarboxylate dihydrochloride monohydrate, M.P. 179–180°.

EXAMPLE 35

Preparation of bis(5-amino-2,2-dimethylpentyl) 9-oxofluorene-2,7-dicarboxylate dihydrochloride hydrate A solution of 9.4 g. (0.0717 mole) of 5-amino-2,2-dimethyl-1-pentanol in 360 ml. of dry chloroform (ethanol-free) is treated with ethereal hydrogen chloride (0.107 mole) and then with 10.88 g. (0.0357 mole) of 9-oxofluorene-2,7-dicarbonyl chloride. This suspension is stirred and refluxed for 27 hours. After standing at room temperature for 3 days, the gummy precipitate is filtered, treated with boiling isopropyl alcohol, filtered and the filtrate is placed under vacuum at room temperature overnight. The moist residue is treated with acetone and filtered. The product is recrystallized from methanol-dry ether, then from water-acetone and dried to give bis(5-amino-2,2-dimethylpentyl) 9-oxofluorene-2,7-dicarboxylate dihydrochloride hydrate, M.P. 245° dec.

$\lambda_{max.}^{water}$ 276 $E_{1\,cm.}^{1\%}$ 1640

EXAMPLE 36

This example illustrates antiviral activity of bis(3-dibutylaminopropyl) 9-oxofluorene-2,7-dicarboxylate dihydrochloride in mice against: Semliki Forest; vesicular stomatitis; influenza A, equine/Prague; Rauscher leukemia; and Vaccinia IHD, viruses, respectively.

This example was performed by substantially the same procedures as described for Examples 1 to 19–I. Groups of mice were inoculated with a fatal dose of the various viruses. Thus, one group received 31 $LD_{50}$ of Semliki Forest virus, another received 50 $ID_{50}$ of vesicular stomatitis, still another group received 68 $LD_{50}$ of influenza A, equine/Prague, still another group received $LD_{100}$ of Rauscher leukemia, and another group received 31 $ID_{50}$ of Vaccinia IHD. The term "$ID_{50}$" as used herein relates to the dose at which infection is produced in 50% of the test animals. An aqueous solution of the active ingredient was administered at timed intervals subcutaneously at dosage levels of about 25 to 500 mg. per kg. of animal weight for a period of time extending from about two days prior to inoculation with virus to about 3 days after such inoculation, except in the case of Rauscher leukemia wherein the active ingredient was administered once within the above dosage range on each of the fifth, sixth, seventh and eighth days after the virus inoculation. The active ingredient was antivirally effective against each of the viruses. In the case of Semliki forest virus and influenza A, equine/Prague virus, the mean survival time of the animals receiving the active ingredient was increased as compared to controls. In the case of vesicular stomatitis virus and Vaccinia IHD virus, there were fewer tail lesions for the mice which received the active ingredient as compared to the controls. In the case of Rauscher leukemia virus, the virus titer was lower in the case of the animals which received the active ingredient as compared to the controls.

EXAMPLE 37

This example shows decreases of virus concentrations in tissue following the use of bis(3-dibutylaminopropyl) 9-oxofluorene-2,7-dicarboxylate dihydrochloride.

(A) Mice were inoculated subcutaneously with a non-fatal inoculum of encephalomyocarditis virus. Mice received one subcutaneous dose of 500 mg./kg. of the active ingredient twenty-four hours prior to inoculation with virus. Brains and hearts were harvested 48 hours post-inoculation, homogenized and appropriate dilutions of brain and heart homogenates were injected intraperitoneally into new groups of mice. The results are presented in Table II.

(B) Mice were inoculated intranasally with a non-fatal inoculum of influenza $A_o$ ($PR_8$) virus. Dosage levels of 50 and 250 mg./kg. of the active ingredient were used and the mice received two subcutaneous doses daily for 3 days. Lungs were harvested 48 hours post-inoculation, homogenized and appropriate dilutions of the lung homogenates were instilled intranasally into new groups of mice. The results are presented in Table III.

TABLE II

Non-fatal anti-encephalomyocarditis virus evaluation in mice with subcutaneously administered bis(3-dibutylaminopropyl) 9-oxofluorene-2,-dicarboxylate dihydrochloride

| Virus challenge dilution | Subcutaneous administration | | Harvest time (hrs.) post-inoculation | | $LD_{50}$ of harvest in mice | | Log change |
|---|---|---|---|---|---|---|---|
| | Mg./kg. | Pre-inoculation time (hrs.) | Brain | Heart | Brain | Heart | |
| $10^{-1}$ | 500 | 24 | 48 | | $10^{-1.0}$ | | |
| $10^{-1}$ | None | | 48 | | $10^{-3.4}$ | | Decrease 2.4 |
| $10^{-1}$ | 500 | 24 | | 48 | | $10^{-2.0}$ | |
| $10^{-1}$ | None | | | 48 | | $10^{-2.8}$ | Decrease 0.8 |

TABLE III

Non-fatal anti-influenza $A_o$ ($PR_8$) virus evaluation in mice with subcutaneously administered bis(3-dibutylaminopropyl) 9-oxofluorene-2,7-dicarboxylate dihydrochloride

| Virus challenge $LD_{50}$ | Subcutaneous administration | | | Lung harvest post-inoculation time in hrs. | STR* lung harvest in mice |
|---|---|---|---|---|---|
| | Mg./kg. dose | Pre-inoculation time in hrs. | Post-inoculation time in hrs. | | |
| 0.022 | 250 | 28, 22, 4 | 2, 20, 26 | 48 | 1.29 |
| 0.022 | 50 | 28, 22, 4 | 2, 20, 26 | 48 | 1.10 |

*STR = Survival time ratio, i.e., $\frac{\text{mean day of death of treated}}{\text{mean day of death of control}}$

What is claimed is:

1. A method for inhibiting viral infections susceptible to replication inhibition by interferon which comprises administering, within an antivirally effective time period, to a host having cells susceptible to invasion by such pathogenic viral agents from about 0.1 to about 500 milligrams per kilogram of body weight of a fluorenone compound of the formula

21 wherein
(A) each Y is oxygen or sulfur;
(B) each A is alkylene of 2 to about 8 carbon atoms and separates the amino nitrogen and Y by an alkylene chain of at least 2 carbon atoms;
(C) each $R^1$ and $R^2$ is hydrogen, alkyl of 1 to about 6 carbon atoms, cycloalkyl of 3 to 6 carbon atoms, alkenyl of 3 to 6 carbon atoms having the vinyl unsaturation in other than the 1 position of the alkenyl group, or each set of $R^1$ and $R^2$ taken together with the nitrogen atom to which they are attached is pyrrolidino, piperidino, N-methyl piperazino; or N-ethyl piperazino; or an acid addition salt of said fluorenone compound.

2. A method of claim 1 wherein the host is a warm blooded animal of mammalian origin.

3. A method of claim 1 wherein each A is alkylene of 2 to 6 carbon atoms; and each $R^1$ and $R^2$ is alkyl of 1 to 6 carbon atoms.

4. A method of claim 1 wherein the $$-\overset{O}{\underset{\parallel}{C}}-Y-A-N\overset{R^1}{\underset{R^2}{\diagdown}}$$

groups are attached to the 2 and 7 positions, respectively, of the fluorenone nucleus; and each $R^1$ and $R^2$ is alkyl of 1 to 5 carbon atoms.

5. A method of claim 1 wherein each Y is oxygen.

6. A method of claim 5 wherein the host is a warm blooded animal of mammalian origin.

7. A method of claim 1 wherein the fluorenone compound is administered during the time elapsing between infection with the viral disease and the appearance of the viral disease symptoms.

8. A method of claim 1 wherein the fluorenone compound is a pharmaceutically acceptable acid addition salt of bis(3-dibutylaminopropyl) - 9 - oxofluorene-2,7-dicarboxylate.

9. A method of claim 8 wherein the host is a warm blooded animal of mammalian origin.

10. A method of claim 1 which comprises administering said compound to a warm blooded animal of mammalian origin infected with a viral infection susceptible to replication inhibition by interferon.

11. A method of clam 10 wherein the $$-\overset{O}{\underset{\parallel}{C}}-Y-A-N\overset{R^1}{\underset{R^2}{\diagdown}}$$

groups are in the 2 and 7 positions, respectively, of the fluorenone nucleus; each $R^1$ and $R^2$ is alkyl of 1 to 5 carbon atoms; each A is alkylene of 2 to 6 carbon atoms; and the fluorenone or salt thereof is administered in unit dosage form containing from about 25 to about 500 milligrams of said fluorenone or salt thereof.

12. A pharmaceutical composition for controlling viral infections susceptible to replication inhibition by interferon comprising a normally liquid parenterally administrable pharmaceutical composition comprising from about 5% to 15%, by weight, of a nonionic surfactant having an HLB of from about 12 to 17; a significant quantity of a sterile, normally liquid pharmaceutical carrier; and from about 0.05% to about 20% by weight of a fluorenone compound of the formula $$R^1\underset{R^2}{\diagup}N-A-Y-\overset{O}{\underset{\parallel}{C}}-\underset{\text{[fluorenone]}}{}-\overset{O}{\underset{\parallel}{C}}-Y-A-N\overset{R^1}{\underset{R^2}{\diagdown}}$$

wherein:
each Y is oxygen or sulfur;
each A is alkylene of 2 to 8 carbon atoms and separates the amino nitrogen and Y by an alkylene chain of at least 2 carbon atoms;

22 each $R^1$ and $R^2$ is hydrogen, alkyl of 1 to 6 carbon atoms, cycloalkyl of 3 to 6 carbon atoms, alkenyl of 3 to 6 carbon atoms having the vinyl unsaturation in other than the 1-position of the alkenyl group, or each set of $R^1$ and $R^2$ taken together with the nitrogen atom to which they are attached is pyrrolidino, piperidino, N-methyl piperazino or N-ethylpiperazino; or a pharmaceutically acceptable acid addition salt thereof.

13. A composition of claim 12 wherein each $R^1$ and $R^2$ is alkyl of 1 to 5 carbon atoms; each A is alkylene of 2 to 6 carbon atoms, and wherein the fluorenone is in the base form.

14. An animal feed composition for controlling viral infections susceptible to replication inhibition by interferon comprising a mixture of a feedstuff and from about .001% to about .02% of said composition of a fluorenone of the formula $$R^1\underset{R^2}{\diagup}N-A-Y-\overset{O}{\underset{\parallel}{C}}-\underset{\text{[fluorenone]}}{}-\overset{O}{\underset{\parallel}{C}}-Y-A-N\overset{R^1}{\underset{R^2}{\diagdown}}$$

wherein
(A) each Y is oxygen or sulfur;
(B) each A is alkylene of 2 to about 8 carbon atoms and separates the amino nitrogen and Y by an alkylene chain of at least 2 carbon atoms;
(C) each $R^1$ and $R^2$ is hydrogen, alkyl of 1 to about 6 carbon atoms, cycloalkyl of 3 to 6 carbon atoms, alkenyl of 3 to 6 carbon atoms having the vinyl unsaturation in other than the 1 position of the alkenyl group, or each set of $R^1$ and $R^2$ taken together with the nitrogen atom to which they are attached is pyrrolidino, piperidino, N-methyl piperazino, or N-ethyl piperazino; or a pharmaceutically acceptable acid addition salt thereof.

15. An animal feed concentrate for controlling viral infections susceptible to replication inhibition by interferon comprising a mixture of a feedstuff and from about 0.5% to about 95% of said composition of a fluorenone of the formula $$R^1\underset{R^2}{\diagup}N-A-Y-\overset{O}{\underset{\parallel}{C}}-\underset{\text{[fluorenone]}}{}-\overset{O}{\underset{\parallel}{C}}-Y-A-N\overset{R^1}{\underset{R^2}{\diagdown}}$$

wherein
(A) each Y is oxygen or sulfur;
(B) each A is alkylene of 2 to about 8 carbon atoms and separates the amino nitrogen and Y by an alkylene chain of at least 2 carbon atoms;
(C) each $R^1$ and $R^2$ is hydrogen, alkyl of 1 to about 6 carbon atoms, cycloalkyl of 3 to 6 carbon atoms, alkenyl of 3 to 6 carbon atoms having the vinyl unsaturation in other than the 1 position of the alkenyl group, or each set of $R^1$ and $R^2$ taken together with the nitrogen atom to which they are attached is pyrrolidino, piperidino, N-methyl piperazino, or N-ethyl piperazino; or a pharmaceutically acceptable acid addition salt thereof.

16. A concentrate of claim 15 wherein the $$-\overset{O}{\underset{\parallel}{C}}-Y-A-N\overset{R^1}{\underset{R^2}{\diagdown}}$$

groups are in the 2 and 7 positions, respectively, of the fluorenone nucleus; each A is alkylene of 2 to 6 carbon atoms; and each $R^1$ and $R^2$ is alkyl of 1 to 5 carbon atoms.

17. A method of inhibiting viral infections susceptible to replication inhibition by interferon which comprises administering to a host which is viable mammalian biological material apart from the intact animal having cells susceptible to invasion by such viral agents from about 0.1 to 10 micrograms per milliliter of substrate maintaining the host cells of a fluorenone compound of the formula

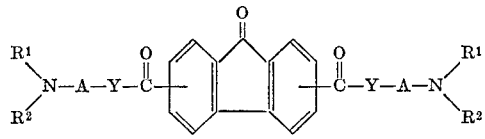

wherein
(A) each Y is oxygen or sulfur;
(B) each A is alkylene of 2 to 8 carbon atoms and separates the amino nitrogen and Y by an alkylene chain of at least 2 carbon atoms;
(C) each $R^1$ and $R^2$ is hydrogen, alkyl of 1 to 6 carbon atoms, cycloalkyl of 3 to 6 carbon atoms, alkenyl of 3 to 6 carbon atoms having the vinyl unsaturation in other than the 1-position of the alkenyl group, or each set of $R^1$ and $R^2$ taken together with the nitrogen atom to which they are attached is pyrrolidino, piperidino, N-methyl piperazino or N-ethyl-piperazino;
or an acid addition salt of said fluorenone compound.

References Cited

Antibiotic News, vol. 5, No. 9, October 1968, pp. 1 and 3.

Finter: Interferons, published by North-Holland Publishing Co., Amsterdam, 1966, pp. 274–276.

Rindsberg: Kialkamine Esters of Fluorenone-2,7-Dicarboxylic Acid as Local Anesthetics, Thesis, Univ. of Cincinnati, 5 pages, 1941.

RICHARD L. HUFF, Primary Examiner

U.S. Cl. X.R.

99—2; 424—267, 274, 308, 250

UNITED STATES PATENT OFFICE
CERTIFICATE OF CORRECTION

PATENT NO. : 3,662,062
DATED : May 9, 1972
INVENTOR(S) : Russell F. Krueger, Harry W. Ritter and Arthur D. Sill It is certified that error appears in the above-identified patent and that said Letters Patent are hereby corrected as shown below:

Column 1, line 62, "autigenicity" should read "antigenicity". Column 3, line 26, "ours" should read "hours". Column 4, line 2, "si" should read "is"; line 7, "pericardities" should read "pericarditis"; line 10, "neutrotropic" should read "neurotropic". Column 7, line 15, "hydroscopic" should read "hygroscopic"; line 28, "hose" should read "host"; line 41, "orrally" should read "orally". Column 9, line 18, "excepients" should read "excipients"; Example 2, No. in control group reads "10" and should read "20". Column 12, Example 7, "Results <5 meg./ml." and should read "STR <5 meg./ml."; Example 16, "Challenge 45 $LD_{55}$" should read "45 $LD_{50}$". Column 14, Example 19-B, "Challenge $LD_{50}$" should read "Challenge $LD_{100}$". Column 17, Example 29, Table, third line from bottom, "(3) contains about 1% water" should read "(2) hemihydrate". Column 19, line 15, "teated" should read "treated". Column 20, line 28, in title of Table II, "9-oxofluorene-2,-dicar" should read "9-oxofluorene-2,7-dicar".

Signed and sealed this 27th day of May 1975.

(SEAL)
Attest:

RUTH C. MASON
Attesting Officer

C. MARSHALL DANN
Commissioner of Patents
and Trademarks